[12] United States Patent
Brown et al.

(10) Patent No.: US 10,489,087 B2
(45) Date of Patent: Nov. 26, 2019

(54) USING A SPACE RELEASE DATA STRUCTURE TO INDICATE TRACKS TO RELEASE FOR A SPACE RELEASE COMMAND TO RELEASE SPACE OF TRACKS IN A CONSISTENCY GROUP BEING FORMED

(71) Applicant: INTERNATIONAL BUSINESS MACHINES CORPORATION, Armonk, NY (US)

(72) Inventors: Theresa M. Brown, Tucson, AZ (US);
Nicolas M. Clayton, Warrington (GB);
Gregory E. McBride, Vail, AZ (US);
Carol S. Mellgren, Tucson, AZ (US);
Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 15/604,420

(22) Filed: May 24, 2017

(65) Prior Publication Data

US 2018/0341404 A1    Nov. 29, 2018

(51) Int. Cl.
*G06F 3/06*    (2006.01)
*G06F 11/14*    (2006.01)

(52) U.S. Cl.
CPC ............ *G06F 3/067* (2013.01); *G06F 3/0608* (2013.01); *G06F 3/0652* (2013.01); *G06F 11/14* (2013.01)

(58) Field of Classification Search
CPC ...... G06F 3/0647; G06F 3/0604; G06F 3/067; G06F 3/0619; G06F 3/0652
(Continued)

(56) References Cited

U.S. PATENT DOCUMENTS 7,246,258 B2    7/2007    Chen et al.
7,873,809 B2    1/2011    Kano
(Continued)

FOREIGN PATENT DOCUMENTS

WO    WO9845978 A2    10/1998
WO    WO03052588 A2    6/2003
(Continued)

OTHER PUBLICATIONS

US20150213105 is the English counterpart of WO 2014056398.
(Continued)

*Primary Examiner* — Hua J Song
(74) *Attorney, Agent, or Firm* — David W. Victor; Konrad Raynes Davda & Victor, LLP

(57) ABSTRACT

Provided are a computer program product, system, and method for using a space release data structure to indicate tracks to release for a space release command to release space of tracks in a consistency group being formed. A space release command is received to free a release space of tracks in a source storage or target storage while transferring changed data in a consistency group to a target storage. A space release data structure is created indicating for each track of the tracks in the release space whether to release or not release the track. The space release data structure is initialized to indicate that each of the tracks is to be released. The tracks in the space release data structure are indicated to be released after the consistency group has completed.

19 Claims, 6 Drawing Sheets

(58) Field of Classification Search
USPC .......................................................... 711/165
See application file for complete search history.

(56) References Cited

U.S. PATENT DOCUMENTS

| | | | |
|---|---|---|---|
| 8,712,974 | B2 | 4/2014 | Datuashvili et al. |
| 9,058,293 | B2 * | 6/2015 | Brown .................. G06F 3/0608 |
| 9,311,016 | B2 | 4/2016 | Ezra et al. |
| 9,417,917 | B1 | 8/2016 | Barber et al. |
| 2007/0233980 | A1 | 10/2007 | Cox et al. |
| 2009/0249116 | A1 | 10/2009 | Bartfai et al. |
| 2014/0208028 | A1 | 7/2014 | Coronado et al. |
| 2014/0237179 | A1 | 8/2014 | Iwamura et al. |
| 2015/0213105 | A1 | 7/2015 | Fan |
| 2015/0242125 | A1 | 8/2015 | Benhase et al. |

FOREIGN PATENT DOCUMENTS

| | | |
|---|---|---|
| WO | WO2008101317 A1 | 8/2008 |
| WO | WO2014056398 | 4/2014 |

OTHER PUBLICATIONS

"Best Practices for DATA replication with EMC ISILON SyncIQ", EMC Corporation, White Paper, Feb. 2016, pp. 39.
U.S. Appl. No. 15/604,433, filed May 24, 2017.

* cited by examiner

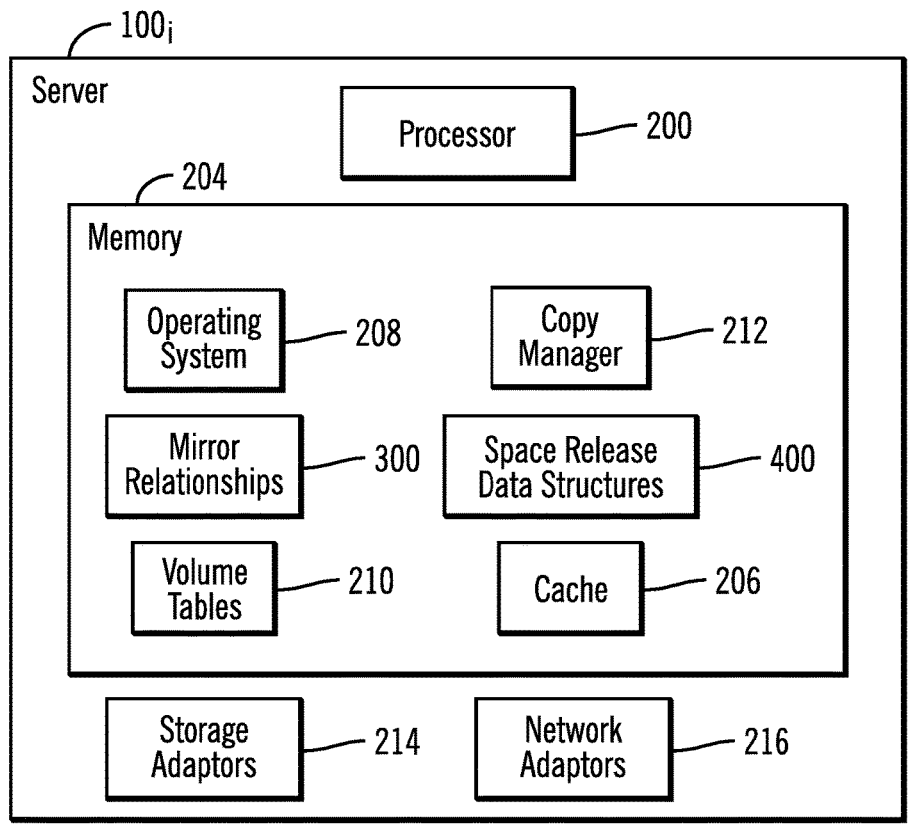
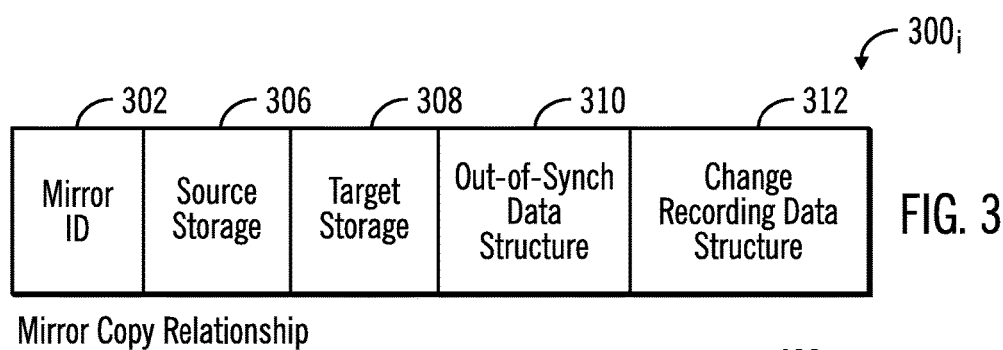
Mirror Copy Relationship
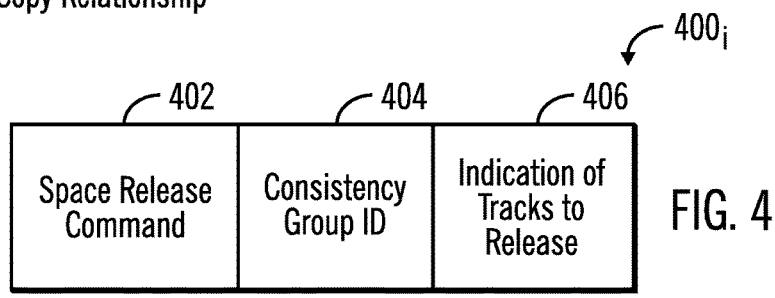
Space Release Data Structure

USING A SPACE RELEASE DATA STRUCTURE TO INDICATE TRACKS TO RELEASE FOR A SPACE RELEASE COMMAND TO RELEASE SPACE OF TRACKS IN A CONSISTENCY GROUP BEING FORMED

BACKGROUND OF THE INVENTION

1. Field of the Invention

The present invention relates to a computer program product, system, and method for using a space release data structure to indicate tracks to release for a space release command to release space of tracks in a consistency group being formed.

2. Description of the Related Art

Storage volumes may be "thin provisioned", meaning that extents of storage space are assigned to the volume but not allocated until needed. Additional extents may be allocated to the volume on an extent boundary at a time when an allocated extent is first written. Extents that are allocated but not being used for a "thin provisioned" volume may be freed to be made unallocated and available to assign to other thin provisioned volumes.

The data in a thin provisioned volume may be subject to a mirror copy operation, such as an asynchronous copy operation to a secondary volume. Data may be copied in consistency groups to provide the mirroring of changed data consistent as of a consistency group time. Data in the consistency group may comprise data that has been updated in the primary volume prior to a time of a next consistency group.

In current systems, if a space release command is received to free tracks within a consistency group being mirrored to a secondary volume, then the consistency group copy is cancelled to allow the space release command to complete. A new consistency group may be formed to cause the copying of all data prior to the previous consistency group formed.

Described embodiments provide improved technological solutions to optimize computer technology related to processing space release commands to release space also in a consistency group in-progress of being formed.

SUMMARY

Provided are a computer program product, system, and method for using a space release data structure to indicate tracks to release for a space release command to release space of tracks in a consistency group being formed. A space release command is received to free a release space of tracks in a source storage or target storage while transferring changed data in a consistency group to a target storage. A space release data structure is created indicating for each track of the tracks in the release space whether to release or not release the track. The space release data structure is initialized to indicate that each of the tracks is to be released. The tracks in the space release data structure are indicated to be released after the consistency group has completed.

BRIEF DESCRIPTION OF THE DRAWINGS

FIG. 2 illustrates an embodiment of components in a server in the storage environment of FIG. 1.

FIG. 3 illustrates an embodiment of copy relationship information.

FIG. 4 illustrates an embodiment of a space release data structure.

DETAILED DESCRIPTION

Figure 1:
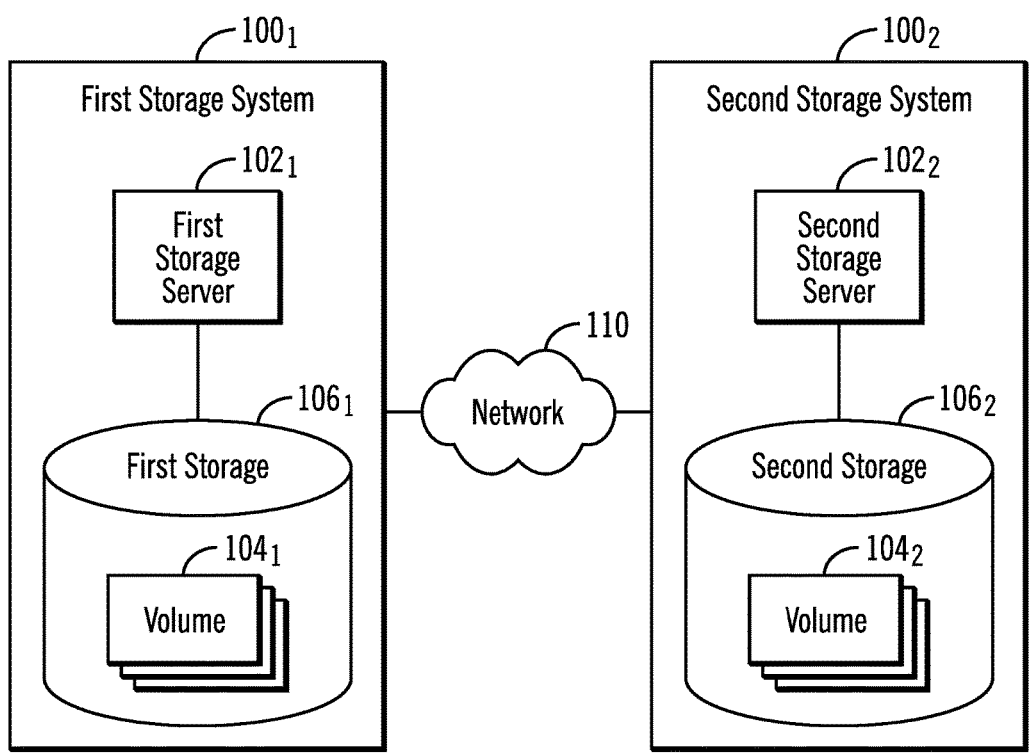
FIG. 1 illustrates an embodiment of a storage environment.

In current art, if a space release command is received to free release space that is within a consistency group in progress of being formed as part of mirroring data to a second storage system, then the consistency group is canceled to allow the free space command to proceed. Described embodiments provide improvements and optimizations to the computer technology of processing free space commands to release space also in a consistency group. With the described embodiments, a space release data structure is created for a space release command to release space in a source storage being mirrored to a target storage to indicate that all tracks in the release space need to be released. At this point any tracks not in the release space may be released and all released tracks in the space release data structure are indicated as not needing to be released. In response to receiving a write to a write track in the release space, in the source storage, and the consistency group while transferring data in the consistency group to the target storage, indication is made in the space release data structure that the write track is not to be released. Upon completing the current consistency group being formed, the tracks in the source storage indicated in the space release data structure indicated as needing to be released are released.

With described embodiments, the processing of space release commands to release space in a source storage in a consistency group being formed is optimized because the consistency group does not need to be cancelled. Instead the space release command may be delayed until the consistency group is formed, and any tracks reallocated, i.e., written to, may be indicated in the space release data structure as not to be released because they have new data.

A further optimization is provided for processing a space release command directed to a target storage to which data is being transferred for a consistency group at the source storage. In such case, upon receiving a space release command directed to the target storage, a space release data structure is created for tracks in the release space in the target storage and indication is made to release tracks in the release space. In response to completing a next consistency group following the consistency group in which the space release command was received, the space in the target storage indicated in the space release data structure is released.

With the further optimizations, a space release command directed to the target storage does not cause the cancellation of the consistency group being formed between the source and target storages, but instead the space release command is delayed until the next consistency group completes before releasing the space for the space release command.

Described embodiments optimize processing of space release commands to a source or target storage while transferring data for a consistency group from the source storage to the second storage by creating a space release data structure to allow the space release command to be processed after the consistency group formation is completed. This avoids the need to cancel the space release command to a release space while a consistency group is being formed with respect to the same release space.

FIG. 1 illustrates an embodiment of a data storage environment having at least two storage systems $100_1$ and $100_2$, each including storage servers $102_1$ and $102_2$, respectively, managing access to volumes $104_1$ and $104_2$ configured in storages $106_1$ and $106_2$. Host systems (not shown) may perform read and write operations with respect to the first storage system $100_1$ over a storage network 110. The first storage $106_1$ may comprise a primary production volume to which hosts direct read and write request. The first storage server $102_1$ may mirror data in the volumes $104_1$ to the second storage system $100_2$ to maintain data in consistency groups at the second storage server $102_2$.

The term "storage system" as used herein may refer to a storage server $102_1$, $102_2$ and/or the storage $106_1$, $106_2$ managed by the server.

The storages $106_1$, $106_2$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $104_1$, $104_2$ may further be configured from an array of devices, such as Just a Bunch of Disks (JBOD), Direct Access Storage Device (DASD), Redundant Array of Independent Disks (RAID) array, virtualization device, etc. Further, the storages $106_1$, $106_2$ may comprise heterogeneous storage devices from different vendors and different types of storage devices, such as a first type of storage devices, e.g., hard disk drives, that have a slower data transfer rate than a second type of storage devices, e.g., SSDs.

The storage network 110 used by the storage systems $100_1$ and $100_2$ to mirror data may comprise a storage network such as one or more interconnected Local Area Networks (LAN), Storage Area Networks (SAN), Wide Area Network (WAN), peer-to-peer network, wireless network, etc.

FIG. 2 shows components of the first server $102_1$ and second server $102_2$, as including a processor 200 and a memory 204 including programs executed by the processor 200 as well as a cache 206 to cache read and write data for the first storage $106_1$. A portion of the cache 206 may also be used to transfer data in a consistency group that is subject to a space release command.

The memory 204 includes an operating system 208, which forms volumes $104_1$ and maintains volume tables 210, such as a volume table of contents (VTOC), file allocation table, etc., providing information on the configured volumes $104_1$. The operating system 208 further manages I/O requests from the host systems with respect to the volumes $104_1$ and process a space release command to release space allocated to one of the volumes $104_1$ to be available for other volumes. The operating system 208 may further manage volumes $104_1$, $104_2$ as thin provisioned volumes and allocate space to the provisioned but unallocated space and issue space release commands to free space allocated to a thin provisioned volume $104_1$ to make available to assign to other volumes $104_1$.

The memory 204 includes a copy manager 212 to create and manage mirror relationships 300 of source data in volumes $104_1$ in the first storage system $100_1$ to target data in the second storage system $100_2$ as part of consistency groups. The memory 204 also includes space release data structures 400 which indicate whether tracks in a release space for a space release command need to be released. In one embodiment, there may be only one space release data structure $400_S$ for a source storage of a mirror copy relationship and multiple space release data structures $400_T$ for a target storage of the mirror copy relationship to which the source storage data is mirrored. The operating system 208 and/or copy manager 212 processes the space release data structures 400 to determine the tracks to release for the source or target storage. In one embodiment, the first storage system $100_1$ may have the source storage and the second storage system $100_2$ may have the target storage of mirror copy relationships to mirror source volumes or other data units to corresponding target volumes or data units.

The servers $102_1$, $102_2$ each include one or more storage adaptors 214 to communicate with devices in the first storage $106_1$ and one or more network adaptors 216 to communicate with the network 110 and manage the transfer of source data being mirrored to target data in a mirror copy relationship.

FIG. 3 illustrates an embodiment of an instance of a mirror relationship $300_1$, which may include a mirror identifier 302 identifying the mirror copy created by the copy manager 212; source storage 306, e.g., primary volume $104_1$ at the primary storage system $100_1$, from which data is copied; target storage 308, e.g., secondary volume $104_2$, at the second storage system $100_2$ to which tracks in the source storage 306 are copied; an out-of-synch data structure 310, such as a bitmap, indicating tracks or other data units in the source storage 306 that have been changed and need to be copied to the target storage 308; and change recording data structure 312, such as a change recording bitmap, indicating source 306 tracks that have been updated or changed to be included in the next consistency group to form.

To create a new consistency group, the change recording data structure 312, indicating data updated while copying changed data for the current consistency group being formed, is merged with the out-of-synch data structure 310, including changed data being copied for the current consistency group. After the merging, the change recording data structure 312 is cleared to record new updates for a next consistency group while the data indicated as changed in the out-of-synch data structure 310 is being copied to the target storage 308 to form the current consistency group.

FIG. 4 illustrates an embodiment of an instance of a space release data structure $400_i$, including a space release command identifier 402 for the space release command for which the space release data structure $400_i$ was generated, a consistency group identifier 404 of the consistency group that was being formed when the space release command 402 was received, and an indication of tracks to release 406, such as a bitmap for the release space, where one value indicates the track needs to be released and another indicates the track should not be released.

In one embodiment, there may be multiple space release data structures $400_i$ for different space release commands received to release space in a target storage $106_2$ during a same consistency group and one space release data structure $400_i$ for a space release command to release space in a source storage $106_1$ for a consistency group.

Figure 5:
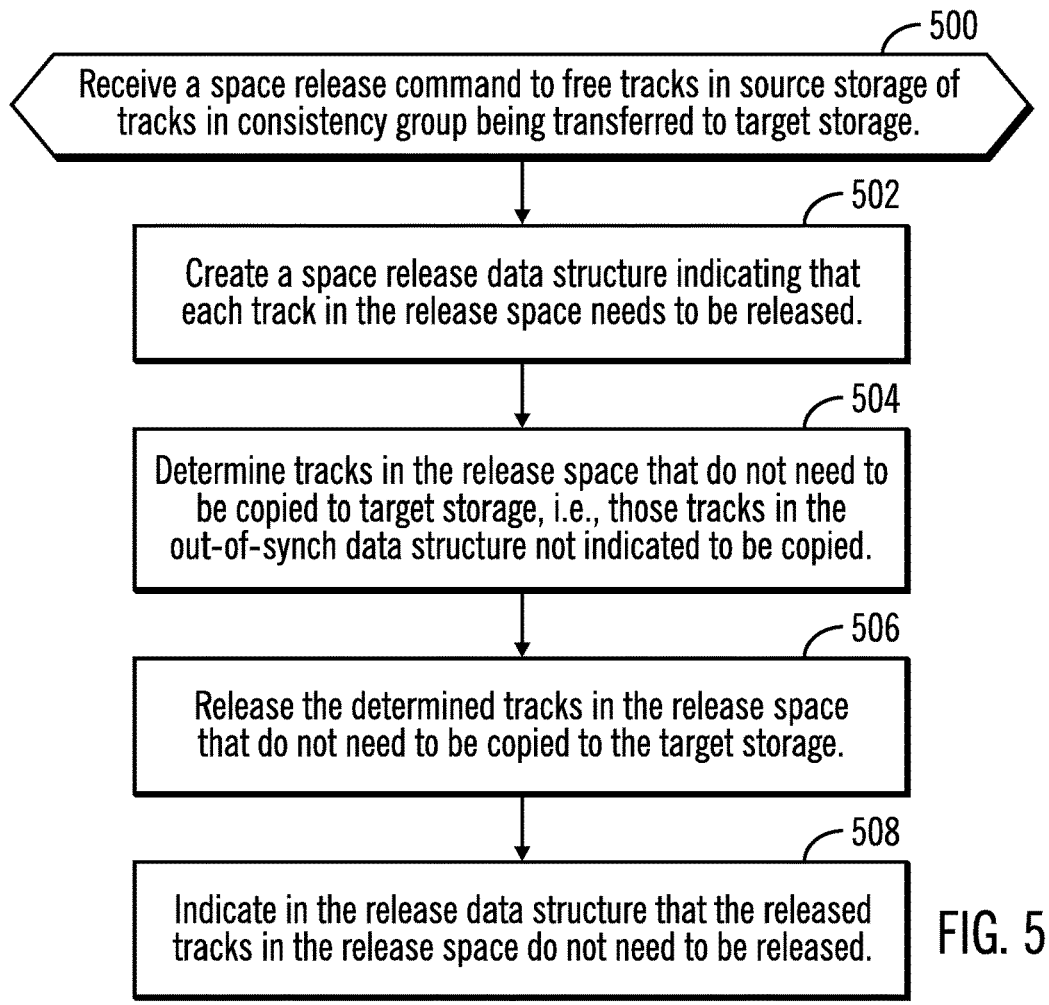
FIG. 5 illustrates an embodiment of operations to process a space release command to free tracks in a source storage in a consistency group.

FIG. 5 illustrates an embodiment of operations performed by the operating system 208, copy manager 212 and/or other component to process a space release command to free tracks in source storage $106_1$ of tracks in consistency group being transferred to a target storage $106_2$. Upon receiving (at block 500) the space release command, a space release data structure $400_i$ is created (at block 502) to indicate, in the indication of tracks to release 406, each track in the release space to release. A determination is made (at block 504) of tracks in the release space that do not need to be copied to the target storage 308 as part of the current consistency group, i.e., those tracks in the out-of-synch data structure 310 not indicated to be copied. The determined tracks in the release space that do not need to be copied for the current consistency group being formed are released (at block 506). In this way, there is an immediate release of tracks in the release space that do not need to be copied to the target storage 308 as part of a consistency group to make those tracks available for allocation to another thin provisioned volume. Indication is then made (at block 508) in the space release data structure $400_i$ in the indication of tracks to release 406 that the released tracks are not to be released again. This is performed so that when the space release command is later executed, those previously released tracks will not be released again.

Figure 6:
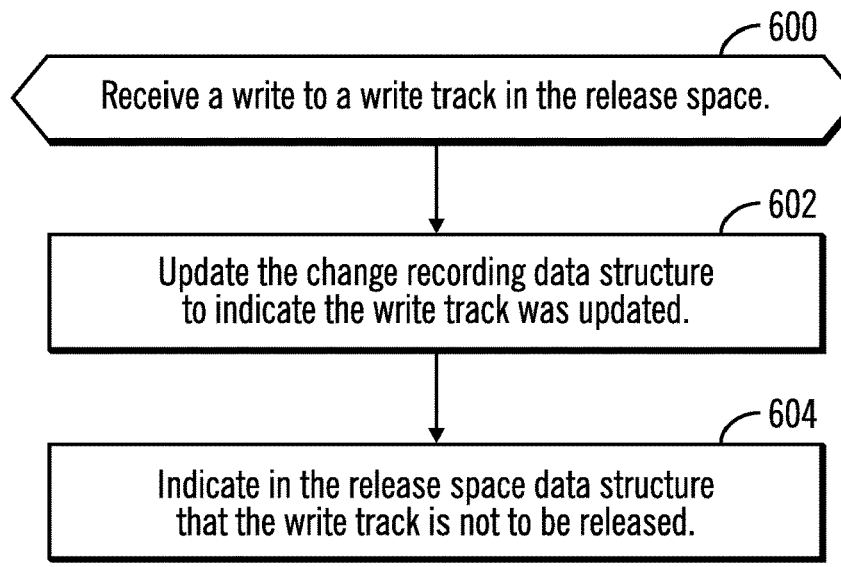
FIG. 6 illustrates an embodiment of operations to process a write to a write track in a release space for a space release command.

FIG. 6 illustrates an embodiment of operations performed by the operating system 208, copy manager 212 and/or other component to process a write request to a write track in the release pace identified in the space release data structure $400_i$ for a source storage 306 in a mirror relationship $300_i$. Upon receiving (at block 600) a write to a write track, the change recording data structure 312 is updated (at block 602) to indicate the write track was updated. Indication is made (at block 604) in the space release data structure $400_i$ that the write track in the release space is not to be released. In this way, a track reallocated to a write that is in the release space for the pending space release command to the source storage 306 will not be released when the space release command is later processed after the consistency group completes, i.e., the out-of-synch data structure 310 is drained or next consistency group completed.

Figure 7:
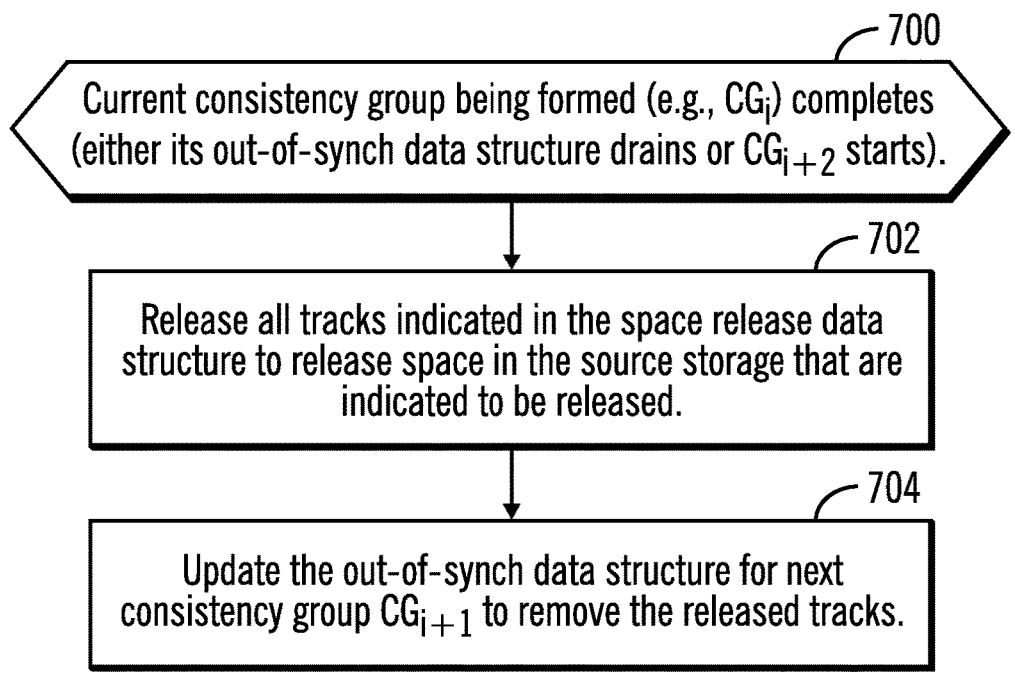
FIG. 7 illustrates an embodiment of operations to release tracks for a space release command when forming a consistency group.

FIG. 7 illustrates an embodiment of operations performed by the operating system 208, copy manager 212 and/or other component to process a space release command 402 after the current consistency group ($CG_i$) 404 completes. A consistency group ($CG_i$) 404 may be considered complete upon copying data for all tracks indicated as needing to be copied in the out-of-synch data structure 310 to the target storage 308 or upon beginning to copy data to form the next consistency group ($CG_{i+1}$), such as by merging the out-of-synch data structure 310 for the current consistency group ($CG_i$) with the change recording data structure 312. Upon completing (at block 700) a consistency group ($CG_i$) 404 for which there is a space release data structure $400_i$, all tracks indicated in the space release data structure $400_i$ as needing to be released, in the indication of tracks to release 406, are released (at block 702). The out-of-synch data structure 310 for the next consistency group ($CG_{i+1}$) to form is updated (at block 704) to remove the released tracks.

A space release data structure $400_i$ to release space in the source storage 306 of a mirror copy relationship $300_i$ may be removed if the first storage system $106_1$ having the source storage 306 becomes a target storage in another mirror copy relationship or is subject to a point-in-time copy operations, such as a snapshot or FlashCopy® (FlashCopy is a registered trademark of International Business Machines Corporation worldwide), after the space release data structure $400_i$ is processed to release the space, and/or of a new space release command is received for the source storage 308.

With the embodiment of FIG. 7, the space release command 402 received while forming a consistency group ($CG_i$) 404, such as by copying tracks indicated in the out-of-synch data structure 310 as needing to be copied, is executed after the consistency group 404 completes. In this way, receiving a space release command does not disrupt the current consistency group being formed by waiting for the consistency group to complete, and ensuring that tracks receiving writes that occur while the consistency group is being formed are not be released when the space release command is executed.

Figure 8:
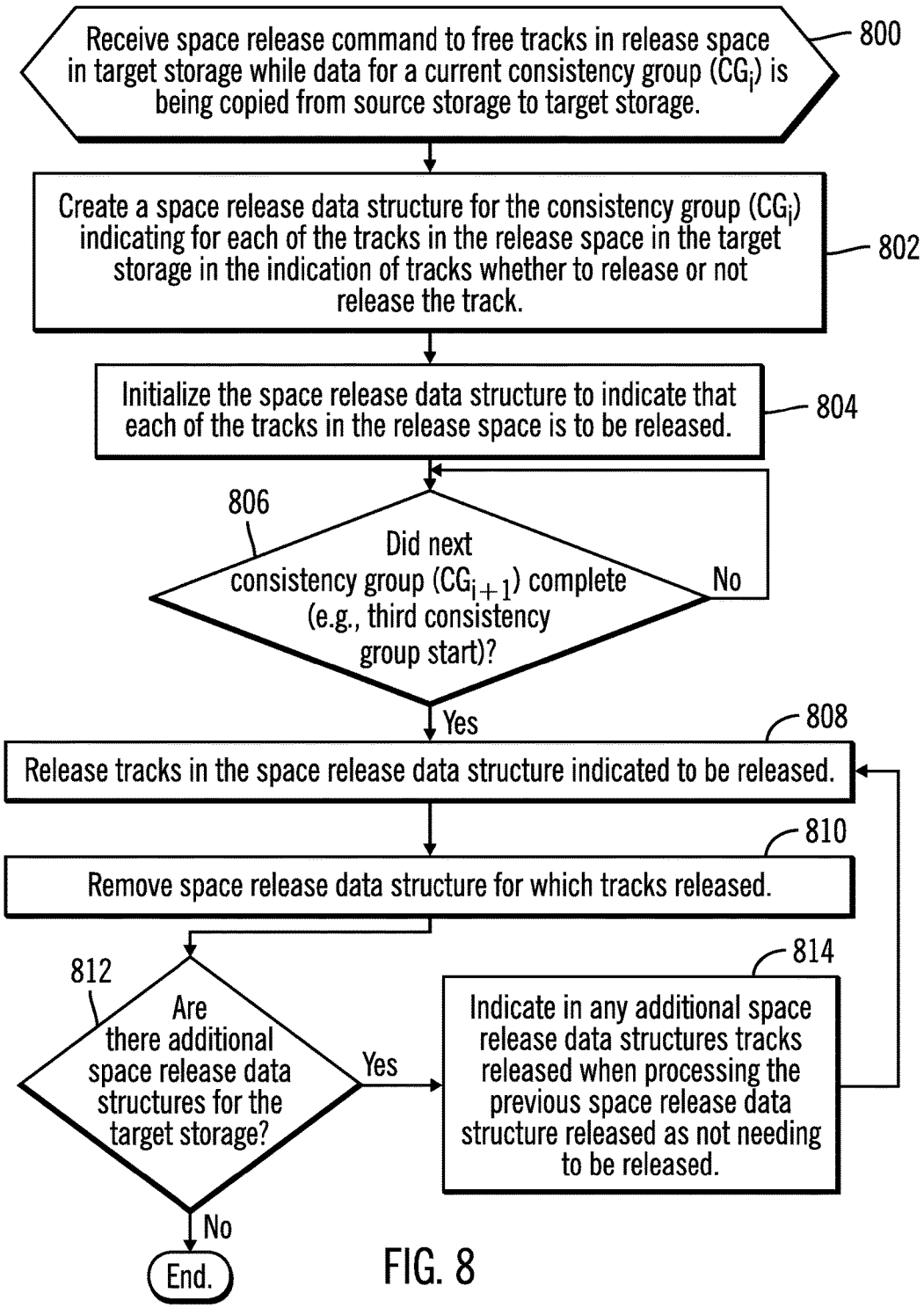
FIG. 8 illustrates an embodiment of operations to process a space release command to release space in a target storage in a consistency group.

FIG. 8 illustrates an embodiment of operations performed by the by the operating system 208, copy manager 212 and/or other component to process a space release command to release space in a target storage 308 of a mirror copy relationship $300_i$. Upon receiving (at block 800) a space release command to free tracks in a release space in the target storage 308 of a mirror copy relationship $300_i$ while data for a current consistency group ($CG_i$) is being copied from a source storage 306 to the target storage 308, a space release data structure $400_i$ for the current consistency group ($CG_i$) is created (at block 802) indicating for each track in the indication of tracks to release 406, in the release space of the target storage 308, whether to release or not release the track. The space release data structure $400_i$ is initialized (at block 804) so that the indication of tracks to release 406 indicates to release each of the tracks in the release space.

When completing the consistency group ($CG_{i+1}$) following the consistency group ($CG_i$) for which the release data structure was created, the tracks in the indication of tracks to release 406 in the space release data structure $400_i$ that are indicated to be released are released (at block 808). The following consistency group ($CG_{i+1}$) is completed upon either draining the out-of-synch data structure 310 for the following consistency group ($CG_{i+1}$) or starting a further following consistency group ($CG_{i+2}$) following the consistency group ($CG_{i+1}$). In embodiments where the source storage 306 and target storage 308 are implemented in first $100_1$ and second $100_2$ storage systems, the copy manager 212 in the first storage system $100_1$ communicates to the copy manager 212 in the second storage system $100_2$ when a consistency group is completed to allow the copy manager 212 in the second storage system $100_2$ to make the determination at block 806.

After releasing space, the space release data structure $400_i$ for which the tracks were released is removed (at block 810). If (at block 812) there are additional space release data structures $400_{i+1}$ for additional received space release commands to the target storage 308 during formation of the current consistency group ($CG_i$), then indication is made (at block 814) in the indication of tracks to release 406 in the additional space release data structures $400_{i+1}$ that the tracks released when processing the previous space release data structure do not need to be released. Control then proceeds to block 808 to release tracks for the next space release data structure for the current consistency group ($CG_i$). If (at block 812) there are no additional space release data structures $400_{i+1}$ for additional received space release commands to the target storage 308 during formation of the current consistency group ($CG_i$), then control ends.

With the embodiment of FIG. 8, for space release commands directed to the target storage 308 of a mirror copy relationship $300_i$, the release space is released upon the completing of the following consistency group, whose completion assures the consistency group to which the space release command was received has completed so that the release space may be released. Further, there may be multiple space release commands directed to a target storage 308 of a mirror copy relationship $300_i$. Described embodiments allow for such multiple space release commands and corresponding space release data structures 400 for a target storage by updating the space release data structures to indicate that tracks released for one space release data structure/command should not be released again.

Described embodiments provide optimizations to the computer technology for processing space release commands directed to source and target storages that are subject to mirror copy relationships having an active consistency group being formed. Descried embodiments allow the space release command to proceed by using a space release data structure which to control which tracks in a release space of a space release command are released.

In the described embodiments, the copy operation comprises a mirror copy operation, such as an asynchronous or synchronous mirror. In alternative embodiments, the copy operation may comprise another type of copy operation such as a point-in-time copy operation, such as a snapshot copy.

The reference characters used herein, such as i, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
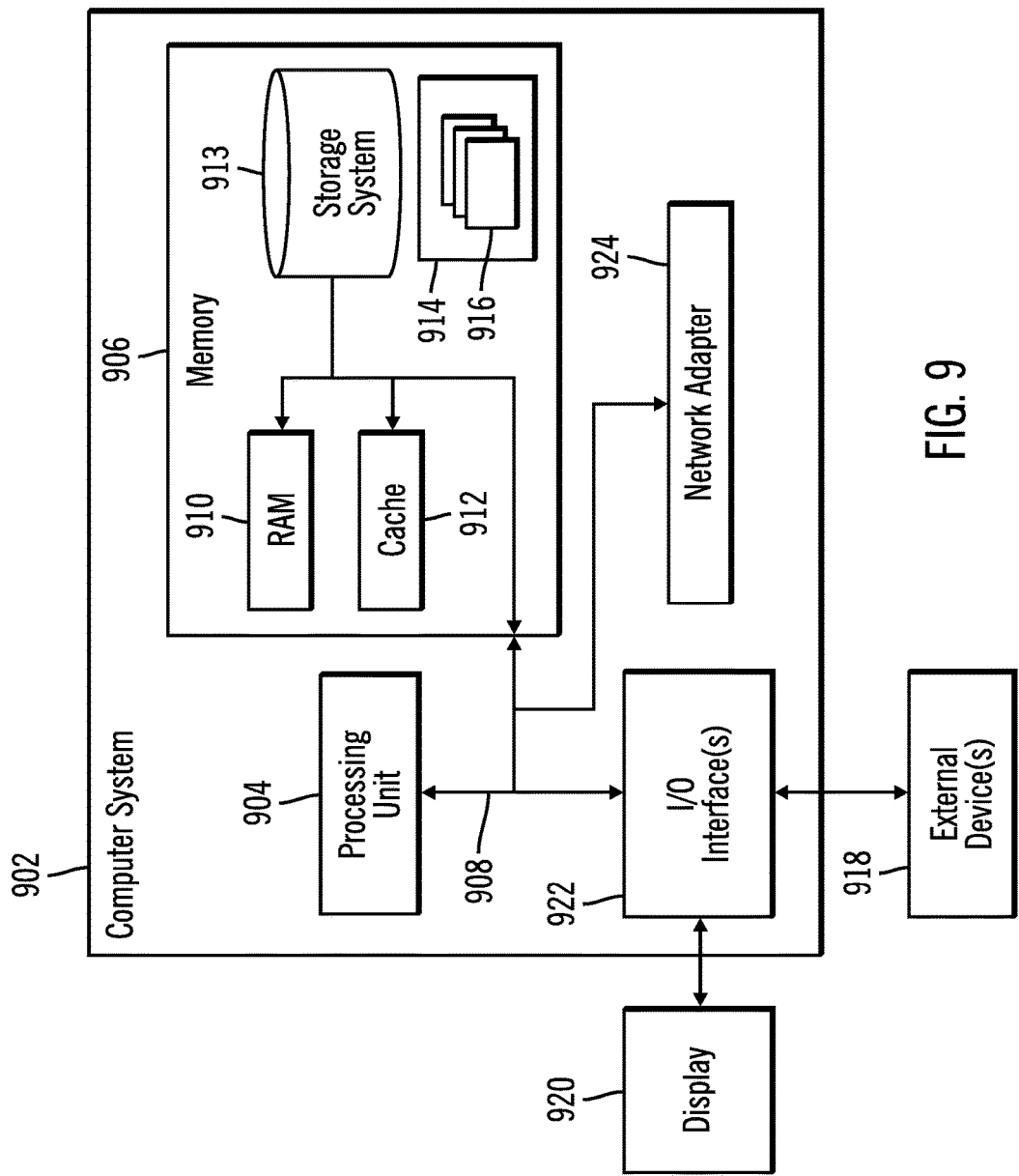
FIG. 9 illustrates a computing environment in which the components of FIG. 1 may be implemented.

The computational components of FIG. 1, including the servers $102_1$, $102_2$ may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing a space release command when mirroring data at a source storage to a target storage, wherein the computer program product comprises a computer readable storage medium having program instructions executable by a processor to cause operations, the operations comprising:
   receiving a space release command to free a release space of tracks in the source storage while transferring changed data in a first consistency group to the target storage after a second consistency group is created following the first consistency group;
   creating a space release data structure indicating for each track of the tracks in the release space whether to release or not release the track;
   initializing the space release data structure to indicate that each of the tracks is to be released;
   releasing tracks in the space release data structure indicated to be released after the first consistency group has completed, wherein the first consistency group is completed in response to at least one of completing transferring data for the second consistency group to the target storage and creating a third consistency group following the second consistency group;
   receiving a write to a write track indicated in the space release data structure and the first consistency group while transferring data in the first consistency group to the target storage; and
   indicating in the space release data structure that the write track is not be released.

2. The computer program product of claim 1, wherein the operations further comprise:
   releasing tracks in the release space and the first consistency group that do not need to be copied to the target storage for the first consistency group; and
   indicating in the space release data structure that the released tracks do not need to be released.

3. The computer program product of claim 1, wherein the operations further comprise:
   maintaining an out-of-synch data structure indicating tracks in the first consistency group that need to be copied to the target storage to form the first consistency group;
   indicating in the out-of-synch data structure that a track transferred to the target storage for the first consistency group does not need to be copied to the target storage;
   freeing tracks indicated in the out-of-synch data structure as not needing to be copied to the target storage and in the release space before completing transferring tracks indicated in the out-of-synch data structure as needing to be copied to the target storage; and
   indicating in the space release data structure that the released tracks do not need to be released.

4. The computer program product of claim 3, wherein tracks indicated in the out-of-synch data structure as needing to be copied to the target storage when the space release command is received are not freed until all the tracks indicated in the out-of-synch data structure as needing to be copied are transferred to the target storage and the space release command is executed.

5. The computer program product of claim 1, wherein the operations further comprise:
   removing the space release data structure in response to at least one of:
      receiving a copy command to create a copy relationship including the source storage as a source or target storage in the copy relationship after generating the space release data structure;
      receiving a subsequent space release command following the space release command; and
      releasing tracks indicated in the space release data structure.

6. A computer program product for processing a space release command when mirroring data at a source storage to a target storage, wherein the computer program product comprises a computer readable storage medium having program instructions executable by a processor to cause operations, the operations comprising:
   receiving a space release command to free a release space of tracks in the target storage while transferring changed data in a first consistency group to the target storage after a second consistency group is created for the source storage;
   creating a space release data structure indicating for each track of the tracks in the release space whether to release or not release the track;
   initializing the space release data structure to indicate that each of the tracks is to be released; and
   releasing the tracks indicated in the space release data structure in response to completing the second consistency group.

7. The computer program product of claim 6, wherein the second consistency group completes in response to creation of a third consistency group for the source storage following the second consistency group.

8. The computer program product of claim 6, wherein the space release command comprises a first space release command, wherein the release space comprises a first release space, and wherein the space release data structure comprises a first space release data structure, wherein the operations further comprise:

receiving a second space release command to free a second release space of tracks in the target storage while transferring changed data for the first consistency group to the target storage after creating the second consistency group;

creating a second space release data structure indicating for each track of the tracks in the second release space in the target storage whether to release or not release the track; and initializing the second space release data structure to indicate that each of the tracks is to be released.

9. The computer program product of claim 8, wherein the releasing tracks in the space release data structure comprises:

releasing tracks in the first space release data structure indicated to be released;

in response to the releasing the tracks in the first space release data structure, indicating in the second space release data structure that tracks released in the first space release data structure are not be released; and after releasing tracks in the first space release data structure, releasing tracks in the second space release data structure indicated to be released.

10. A system for processing a space release command when mirroring data at a source storage to a target storage, comprising a processor; and a computer readable storage medium having program instructions executable by a processor to cause operations, the operations comprising:

receiving a space release command to free a release space of tracks in the source storage while transferring changed data in a first consistency group to the target storage after a second consistency group is created following the first consistency group;

creating a space release data structure indicating for each track of the tracks in the release space whether to release or not release the track;

initializing the space release data structure to indicate that each of the tracks is to be released;

releasing tracks in the space release data structure indicated to be released after the first consistency group has completed, wherein the first consistency group is completed in response to at least one of completing transferring data for the second consistency group to the target storage and creating a third consistency group following the second consistency group;

receiving a write to a write track indicated in the space release data structure and the first consistency group while transferring data in the first consistency group to the target storage; and indicating in the space release data structure that the write track is not be released.

11. The system of claim 10, wherein the operations further comprise:

maintaining an out-of-synch data structure indicating tracks in the first consistency group that need to be copied to the target storage to form the first consistency group;

indicating in the out-of-synch data structure that a track transferred to the target storage for the first consistency group does not need to be copied to the target storage;

freeing tracks indicated in the out-of-synch data structure as not needing to be copied to the target storage and in the release space before completing transferring tracks indicated in the out-of-synch data structure as needing to be copied to the target storage; and indicating in the space release data structure that the released tracks do not need to be released.

12. The system of claim 11, wherein tracks indicated in the out-of-synch data structure as needing to be copied to the target storage when the space release command is received are not freed until all the tracks indicated in the out-of-synch data structure as needing to be copied are transferred to the target storage and the space release command is executed.

13. A system for processing a space release command when mirroring data at a source storage to a target storage, comprising a processor; and a computer readable storage medium having program instructions executable by a processor to cause operations, the operations comprising:

receiving a space release command to free a release space of tracks in the target storage while transferring changed data in a first consistency group to the target storage after a second consistency group is created for the source storage;

creating a space release data structure indicating for each track of the tracks in the release space whether to release or not release the track;

initializing the space release data structure to indicate that each of the tracks is to be released;

releasing tracks in the space release data structure indicated to be released after the consistency group has completed; and releasing the tracks indicated in the space release data structure in response to completing the second consistency group.

14. The system of claim 13, wherein the space release command comprises a first space release command, wherein the release space comprises a first release space, and wherein the space release data structure comprises a first space release data structure, wherein the operations further comprise:

receiving a second space release command to free a second release space of tracks in the target storage while transferring changed data for the first consistency group to the target storage after creating the second consistency group;

creating a second space release data structure indicating for each track of the tracks in the second release space in the target storage whether to release or not release the track; and initializing the second space release data structure to indicate that each of the tracks is to be released.

15. A method, performed by a processor, for processing a space release command when mirroring data at a source storage to a target storage, comprising:

receiving a space release command to free a release space of tracks in the source storage while transferring changed data in a first consistency group to the target storage after a second consistency group is created following the first consistency group;

creating a space release data structure indicating for each track of the tracks in the release space whether to release or not release the track;

initializing the space release data structure to indicate that each of the tracks is to be released;

releasing tracks in the space release data structure indicated to be released after the first consistency group has completed, wherein the first consistency group is completed in response to at least one of completing transferring data for the second consistency group to the target storage and creating a third consistency group following the second consistency group;

receiving a write to a write track indicated in the space release data structure and the first consistency group while transferring data in the first consistency group to the target storage; and indicating in the space release data structure that the write track is not be released.

16. The method of claim 15, further comprising:

maintaining an out-of-synch data structure indicating tracks in the first consistency group that need to be copied to the target storage to form the first consistency group;

indicating in the out-of-synch data structure that a track transferred to the target storage for the first consistency group does not need to be copied to the target storage;

freeing tracks indicated in the out-of-synch data structure as not needing to be copied to the target storage and in the release space before completing transferring tracks indicated in the out-of-synch data structure as needing to be copied to the target storage; and indicating in the space release data structure that the released tracks do not need to be released.

17. The method of claim 16, wherein tracks indicated in the out-of-synch data structure as needing to be copied to the target storage when the space release command is received are not freed until all the tracks indicated in the out-of-synch data structure as needing to be copied are transferred to the target storage and the space release command is executed.

18. A method, performed by a processor, for processing a space release command when mirroring data at a source storage to a target storage, comprising:

receiving a space release command to free a release space of tracks in the source storage or target storage while transferring changed data in a first consistency group to the target storage after a second consistency group is created for the source storage;

creating a space release data structure indicating for each track of the tracks in the release space whether to release or not release the track;

initializing the space release data structure to indicate that each of the tracks is to be released;

releasing tracks in the space release data structure indicated to be released after the consistency group has completed; and releasing the tracks indicated in the space release data structure in response to completing the second consistency group.

19. The method of claim 18, wherein the space release command comprises a first space release command, wherein the release space comprises a first release space, and wherein the space release data structure comprises a first space release data structure, further comprising:

receiving a second space release command to free a second release space of tracks in the target storage while transferring changed data for the first consistency group to the target storage after creating the second consistency group;

creating a second space release data structure indicating for each track of the tracks in the second release space in the target storage whether to release or not release the track; and initializing the second space release data structure to indicate that each of the tracks is to be released.

* * * * *